United States Patent
Sanchez Martinez et al.

(10) Patent No.: US 11,635,111 B2
(45) Date of Patent: Apr. 25, 2023

(54) PERSONAL CARE DEVICE WITH SEPARABLE COUPLING IN DRIVE TRAIN

(71) Applicant: Braun GmbH, Kronberg (DE)

(72) Inventors: Pedro Sanchez Martinez, Kronberg (DE); Holger Budke, Roedermark (DE)

(73) Assignee: Braun GMBH, Kronberg (DE)

( * ) Notice: Subject to any disclaimer, the term of this patent is extended or adjusted under 35 U.S.C. 154(b) by 374 days.

(21) Appl. No.: 16/864,195

(22) Filed: May 1, 2020

(65) Prior Publication Data

US 2020/0347890 A1    Nov. 5, 2020

(30) Foreign Application Priority Data

May 2, 2019   (EP) ..................... 19172199

(51) Int. Cl.
  *B25F 5/00*    (2006.01)
  *A46B 13/02*   (2006.01)
  (Continued)

(52) U.S. Cl.
  CPC .......... *F16D 3/2055* (2013.01); *A46B 5/0095* (2013.01); *A46B 13/02* (2013.01);
  (Continued)

(58) Field of Classification Search
  CPC .. F16D 3/2055; F16D 2200/0034; F16D 3/16; F16D 3/205; A46B 5/0095;
  (Continued)

(56) References Cited

U.S. PATENT DOCUMENTS 3,859,684 A * 1/1975 Moskwinski .......... A61C 17/26
                                                  15/23
4,506,400 A * 3/1985 Klein ................. A61C 17/3418
                                                  74/48
(Continued)

FOREIGN PATENT DOCUMENTS

CN         1703171 A    11/2005
CN       101479497 A     7/2009
(Continued)

OTHER PUBLICATIONS

European search report dated Oct. 10, 2019.
CM-5079Q PCT Search Report and Written Opinion for PCT/IB2020/054035 dated May 26, 2020, 12 pages.

*Primary Examiner* — Robert J Scruggs
(74) *Attorney, Agent, or Firm* — Kevin Johnson; StefanMichael Schneider

(57) ABSTRACT

The present disclosure is concerned with a personal care device having a head portion having a driven treatment head, a handle portion having a drive unit for providing a motion having a motion direction, and a drive train extending between the drive unit and the driven treatment head for transmitting the motion from the drive unit to the driven treatment head, the drive train having a separable coupling. The separable coupling has a first coupling part having a first coupling element, a second coupling part having a second coupling element, the first and the second coupling elements being separably engaged with each other, and a resilient element biasing the first coupling element and the second coupling element against each other so that the first and second coupling elements are engaged in a gap-free manner along the motion direction.

14 Claims, 2 Drawing Sheets

(51) Int. Cl.
*A46B 5/00* (2006.01)
*F16D 3/205* (2006.01)
*H04L 9/40* (2022.01)
*A61C 17/22* (2006.01)

(52) U.S. Cl.
CPC ............ *A61C 17/222* (2013.01); *B25F 5/001* (2013.01); *H04L 63/08* (2013.01); *F16D 2200/0034* (2013.01)

(58) Field of Classification Search
CPC ............ A46B 13/02; A46B 2200/1006; A46B 2200/102; A46B 5/00; A46B 13/00; A61C 17/222; B25F 5/001; B25F 5/00; A45D 26/0038; A45D 26/0052; A45D 26/0076; H04L 63/08
See application file for complete search history.

(56) References Cited

U.S. PATENT DOCUMENTS

| | | | |
|---|---|---|---|
| 5,213,434 A | 5/1993 | Hahn | |
| 5,214,819 A | 6/1993 | Kirchner | |
| 5,365,627 A * | 11/1994 | Jousson | A61C 17/222 403/380 |
| 5,412,827 A * | 5/1995 | Muller | A61C 17/22 15/22.1 |
| 5,617,601 A * | 4/1997 | McDougall | A46B 13/02 15/28 |
| 2003/0221270 A1 | 12/2003 | Kuo | |
| 2005/0108838 A1 | 5/2005 | Schaefer et al. | |
| 2012/0326370 A1 | 12/2012 | Kloster et al. | |
| 2013/0198980 A1* | 8/2013 | Iwahori | A61C 17/3481 15/22.1 |
| 2014/0352091 A1* | 12/2014 | Bresselschmidt | A46B 5/007 15/146 |
| 2017/0238686 A1 | 8/2017 | Sanchez Martinez et al. | |

FOREIGN PATENT DOCUMENTS

| | | | |
|---|---|---|---|
| CN | 106983569 | * | 7/2017 |
| CN | 106983569 A | | 7/2017 |
| EP | 3466296 A1 | | 4/2019 |
| JP | 2012247070 A | | 12/2012 |
| WO | WO2005046506 | * | 5/2005 |

* cited by examiner

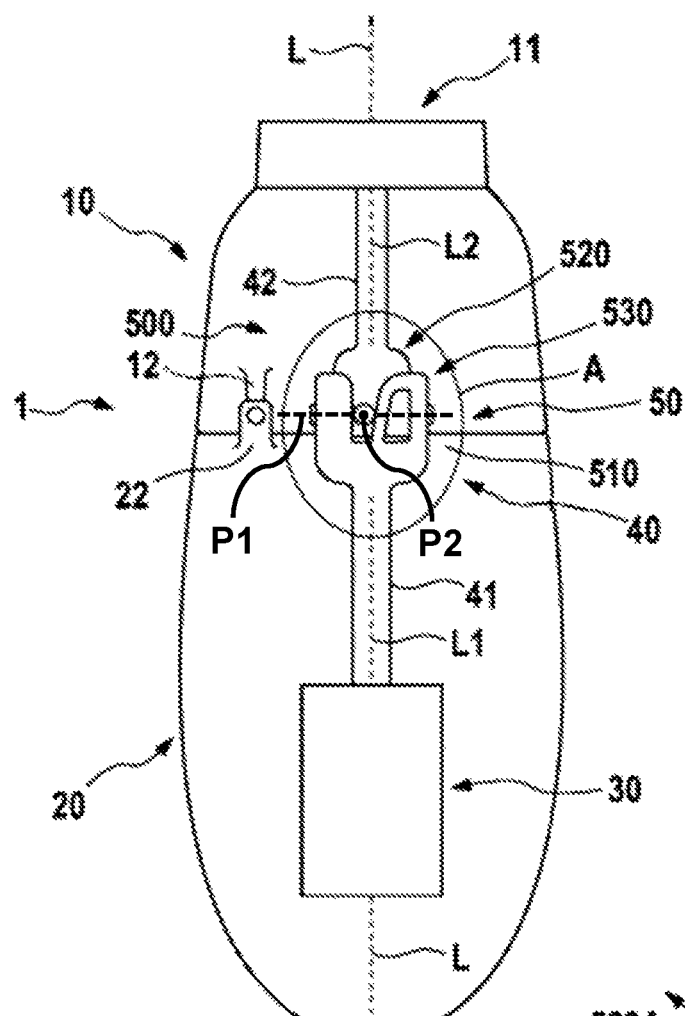
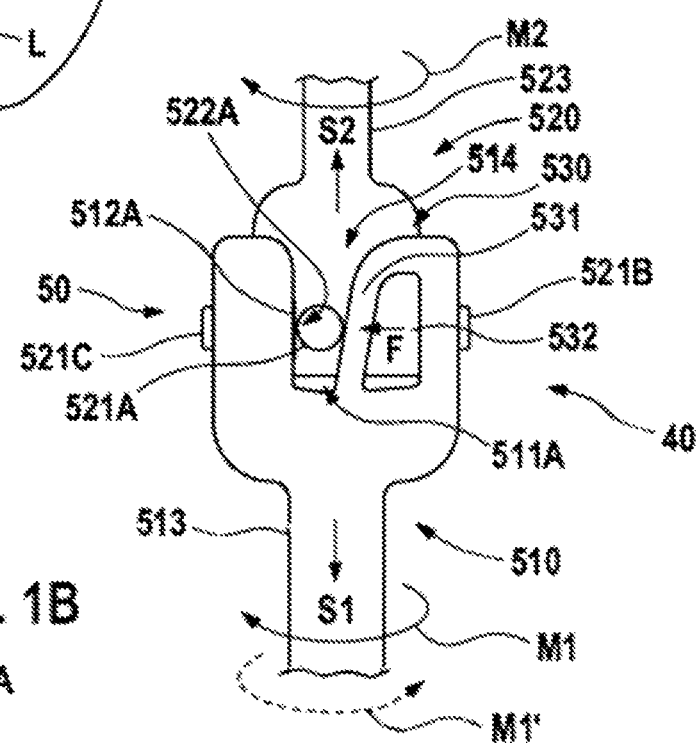

PERSONAL CARE DEVICE WITH SEPARABLE COUPLING IN DRIVE TRAIN

FIELD OF THE INVENTION

The present disclosure is concerned with a personal care device that has a drive train for coupling a drive unit with a driven treatment head, where the drive train has a separable coupling.

BACKGROUND OF THE INVENTION

It is generally known that a personal care device may comprise a handle portion and a head portion that can be detached from the handle portion, e.g. for cleaning purposes or for replacement. In case the head portion comprises a driven treatment head, this requires that the drive train between a drive unit in the handle portion and the driven treatment head in the head portion must be separable. The separable coupling may then, e.g., comprise two gear wheels that have gear teeth that are in engagement with each other in the attached state and that become disengaged once the head portion and the handle portion are separated from each other.

It is a general object to improve personal care devices of the described type, in particular with respect to their noise behavior and/or the wear of the separable coupling parts.

SUMMARY OF THE INVENTION

In accordance with an aspect, a personal care device is provided having a head portion having a driven treatment head, a handle portion having a drive unit for providing a motion having a motion direction, and a drive train extending between the drive unit and the driven treatment head for transmitting the motion from the drive unit to the driven treatment head, the drive train having a separable coupling, the separable coupling has a first coupling part having a first coupling element, a second coupling part having a second coupling element, the first and the second coupling elements being separably engaged with each other, and a resilient element biasing the first coupling element and the second coupling element against each other so that the first and second coupling elements are engaged in a gap-free manner along the motion direction.

BRIEF DESCRIPTION OF THE DRAWINGS

The present disclosure and the proposed personal care device will be further elucidated by a detailed description with reference to figures. In the figures FIG. 1A is a schematic depiction of an example personal care device in accordance with the present disclosure;

FIG. 1B is a magnification of the separable coupling shown in FIG. 1A;

DETAILED DESCRIPTION OF THE INVENTION

Figure 2:
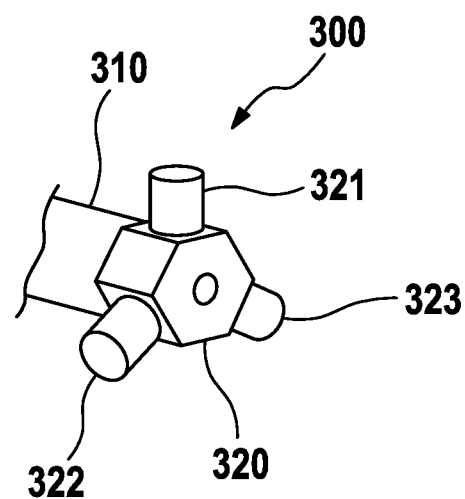
FIG. 2 is a schematic and isolated perspective view of one example coupling part of a separable coupling in accordance with the present disclosure.

In the context of the present description "personal care" shall mean the nurture (or care) of the skin and of its adnexa (i.e. hairs and nails) and of the teeth and the oral cavity (including the tongue, the gums etc.), where the aim is on the one hand the prevention of illnesses and the maintenance and strengthening of health ("care") and on the other hand the cosmetic treatment and improvement of the appearance of the skin and its adnexa or of the teeth and the oral cavity. It shall include the maintenance and strengthening of well-being. This includes skin care, hair care, and oral care as well as nail care. This further includes grooming activities such as beard care, shaving, and depilation. A "personal care device" thus means any device for performing such nurturing or grooming activity, e.g. (cosmetic) skin treatment devices such as skin massage devices or skin brushes; wet razors; electric shavers or trimmers; electric epilators; and oral care devices such as manual or electric toothbrushes, (electric) flossers, (electric) irrigators, (electric) tongue cleaners, or (electric) gum massagers. This shall not exclude that the proposed personal care system may have a more pronounced benefit in one or several of these nurturing or device areas than in one or several other of these areas.

In accordance with the present description, the drive train of the proposed personal care device comprises a separable coupling, which separable coupling comprises a first coupling part and a second coupling part. The first coupling part comprises a first coupling element and the second coupling part comprises a second coupling element. The first coupling element and the second coupling element are engaged with each other in the attached state to enable the transfer of motion from the first coupling part to the second coupling part or vice versa. The separable coupling further comprises a resilient element that biases the first coupling element and the second coupling element against each other and by this biasing it is as well assured that the two coupling elements are engaged with each other in a gap-free manner, in particular in a motion direction of the motion that shall be transferred from the drive unit to the driven treatment head. As there is no gap between the coupling elements, the two coupling elements can essentially not decouple from each other during operation. Such decoupling may otherwise generate noise (as the coupling elements will eventually bump against each other) and may also lead to wear of the two engaged coupling elements. In the motion direction, the first and the second coupling element interact by abutting force transmission surfaces that are provided at parts of the first and second coupling elements that are essentially not resilient. That means that the resilient element is arranged elsewhere, but not in motion direction (but see below for the arrangement of two resilient elements). The resilient element may be arranged in reverse motion direction. The force transmission surfaces are disposed at sides of the first and second coupling elements that are not resilient by design. This shall enable a good power transfer and energy is not consumed by a deflection of the parts at which the force transmission surfaces are provided. As all materials have a certain resiliency, the resilient properties of the parts at which the force transmission surface are arranged shall be less than the resilient properties of the resilient element. Expressed by a spring constant, the spring constant of the parts at which the force transmission surfaces are realized is at least about a factor of two higher than a spring constant of the resilient element.

The resilient element may be designed so that the applied biasing force is higher than the usual forces that occur during regular operation of the personal care device in reverse motion direction. Forces higher than the biasing force and acting in reverse motion direction would deflect the spring element and thus will lead to a decoupling of the first and second coupling elements. The biasing force may thus be defined by measuring the typical forces occurring during regular operation of the personal care device and by setting a threshold so that in average only during 50% or less of the treatment period a decoupling of the first and second coupling elements occurs, or for 25% or less or for 10% or less or for 5% or less or for 4%, 3%, 2%, or 1% or less.

In at least one embodiment, the first and second coupling parts comprise further engaging pairs of coupling elements, e.g. at least a second pair of coupling elements. The separable coupling may have three or four or more pairs of engaging coupling elements. In such an embodiment, a second resilient element may be provided, which second resilient element may then be disposed in motion direction so that the coupling elements of the second pair of coupling elements are biased against each other and interact at force transmission surfaces that are disposed in the reverse motion direction. This allows that the motion direction may be reversed without losing the effect of the motion transfer via essentially not resilient force transmission surfaces.

The motion that is transferred from the drive unit to the driven treatment head may be a rotary motion. In some embodiments, the rotary motion may be an oscillating rotary motion, or the personal care device may comprise the possibility to revert the rotary motion, e.g. by means of a respective input device such as a button or a touch screen. It shall also not be excluded that the motion is a linear motion or a more complex motion.

In at least one embodiment, the first coupling element is one of a receiving portion (also named: receptacle) and a projection (e.g. a pin) and the second coupling element is the other one of the receiving portion and the projection. The receptacle may have an open end in a direction along which the first and second coupling parts are intended to be separated. The open end may have a chamfer to accommodate an easy attachment of the separated coupling parts in which the projection will be guided into the receiving portion despite an offset between the two coupling elements due to the chamfer.

The resilient element may be arranged integral with one of the first or second coupling parts, e.g. it may form one side of the receiving portion in above mentioned example. The resilient element may comprise a spring arm that can deflect from a rest position into a deflected position in the coupled state. E.g. the first coupling element is realized as a receptacle and the second coupling element is realized as a projection engaging with the receptacle when the coupling parts are attached. One side of the receptacle may then be realized by the resilient element, e.g. a spring arm that can deflect into a hollow. The receptacle may now be designed smaller than the corresponding size of the projection that enters the receptacle. The larger sized projection then deflects the spring arm of the resilient element from its rest state into a deflected state. Under such deflection, the resilient element provides a biasing force that pushes the two coupling elements against each other. The resilient element may in particular be arranged in a direction opposite to the motion direction so that during operation the two coupling elements transmit the motion via two force transmitting surfaces that are not resilient (ignoring any resiliency of the bulk material from which the coupling elements are made) as was already discussed. The resilient element may be made from the same material as the coupling part at which it is integrally provided. The material may be a plastic material such a polyoxymethylene, which shall not exclude any other material. In some embodiments, at least a portion of the resilient element is made from metal, e.g. from spring metal forming for example a spring sheet that may be at least partly overmolded by plastic.

The treatment head and the handle portion of the personal care device may be arranged to be pivotable with respect to each other around at least one pivot axis. In order to accommodate such a relative pivoting motion of the first and second coupling parts, the separable coupling may be realized as a separable universal joint 500. The pivot angle may have an absolute range in the order of 1 degree to 50 degrees. The handle portion and the treatment head may also be arranged to be pivotable to each other around two in particular perpendicular pivot axes P1, P2, see FIG. 1A.

The handle portion and the head portion may be secured to each other by means of at least one pair of separable mechanical connector elements such as a snap hook and a corresponding receptacle for receiving the snap hook.

FIG. 1A is a schematic depiction of an example personal care device 1 in accordance with the present disclosure. The personal care device 1 has a head portion 10 and a handle portion 20 that are separably connected with each other. The head portion 10 comprises a treatment head 11, which treatment head 11 has at least one part that is arranged for being driven into motion (for simplification it is in the following said that the treatment head 11 is driven during operation of the personal care device, which shall be understood that at least one part of the treatment head 11 is driven, which shall not exclude that the complete treatment head 11 is driven into motion). A drive unit 30 is disposed in the handle portion 20. A drive train 40 extends between the drive unit 30 and the treatment head 11 to transmit a motion provided by the drive unit 30 to the treatment head 11. The drive train 40 comprises a separable coupling 50 arranged so that when the head portion 10 and the handle portion 20 are separated, also the separable coupling 50 becomes separated. The head portion 10 and the handle portion 20 may comprise at least one pair of mechanical connector elements 12, 22. The head portion 10 may comprise a mechanical connector element 12 and the handle portion 20 may comprise a mechanical connector element 22, which pair of mechanical connector elements 12, 22 is mechanically connecting the head portion 10 and the handle portion 20 together. In some embodiments, the head portion 10 and the handle portion 20 comprise two or more pairs of mechanical connector elements. One of the mechanical connector elements 12, 22 may be arranged as a snap hook and the other one as a receptacle for receiving at least a portion of the snap hook, e.g. a nose of the snap hook. This shall not exclude hat other mechanical connector elements may be used.

The separable coupling 50 has a first coupling part 510 and a second coupling part 520 that are separably engaged with each other as will be explained in detail with respect to FIG. 1B. The separable coupling 50 further comprises a resilient element 530.

FIG. 1B is a magnification of the separable coupling 50 shown in FIG. 1A. The first coupling part 510 comprises a first coupling element 511A and the second coupling part 520 comprises a second coupling element 512A. It is also shown that the drive train 40 comprises a first shaft 513 that is connected with the first coupling part 510 to transmit a motion M1 that is provided by the drive unit and also a second shaft 523 that is connected with the second coupling part 520 to transmit a motion M2, where M2=M1 as the coupling 50 does not have any transmission ratio. The coupling 50 can be separated by moving the first coupling part 510 relative to the second coupling part 520 in a separation direction S1 or vice versa moving the second coupling part 520 relative to the first coupling part 510 in a separation direction S2.

In the shown embodiment, the resilient element 530 is realized as an element being integral with the first coupling part 510. This is to be understood as a non-limiting example and the resilient element 530 might also be arranged at the second coupling part 520 or may otherwise form part of the separable coupling 50. In the shown example, the resilient element 530 comprises a spring arm 531 that is in a deflected position (a hollow 532 is provided behind the spring arm 531 so that the spring arm 531 has enough place to deflect). The spring arm 531 thus applies a biasing force F onto the second coupling element 521A and thereby pushes a force transmission surface 522A of the second coupling element 521A against a force transmission surface 512A of the first coupling element 511A. Because of its designed resilient properties, i.e. its spring properties, the spring arm 531 of the resilient element 530 will move back into its rest position when the first coupling part 510 and the second coupling part 520 become disengaged (i.e. separated). By means of the resilient element 530, the first coupling element 511A and the second coupling element 521A are engaged in a gap-free manner with respect to the motion direction of the motion M1. Due to the gap-free engagement and due to the biasing force F, the first and second coupling elements 511A, 521A will essentially always be in force transmission contact at their force transmission surfaces 512A, 522A. In a case where a gap is present between coupling elements, uneven motion of the drive unit or a load on the treatment head could cause that the coupling elements loose contact, in particularly repeatedly, and then bump against each other again when they get again into contact, which generates noise and wear of the components. The resilient element 530 may be arranged so that the biasing force is larger than typical forces that might be applied by the second coupling element 522A at the spring arm 531. In some embodiments, the drive train 40 may comprise an overload clutch so that the forces applied at the resilient element 530 are limited.

In FIG. 1B it is indicated that the separable coupling 50 may have more than one pair of coupling elements 511A, 521A. Two further pin-like coupling elements 521B and 521C are shown that are in engagement with respective receptacle-like coupling elements provided at the first coupling part 510. As the relative position between the first coupling part 510 and the second coupling part 520 is defined by the first pair of coupling elements 511A, 521A, any other pair of coupling elements does not need to be engaged in a gap-free manner. In some embodiments, a second resilient element may be present and this second resilient element may be arranged together with a second pair of coupling elements in a manner mirrored with respect to the motion direction of motion M1 to the shown arrangement of resilient element 530 and first pair of coupling elements 511A and 521A. Such a mirrored arrangement would then take over the force transmission in the inverse motion direction of a motion M1'. In case only the shown arrangement of the resilient element 530 and of the first pair of coupling elements 511A and 521A is present, some energy would get lost due to the elasticity of the resilient element 530 when the motion direction is inverted to M1'.

FIG. 2 is a schematic and perspective depiction of an example coupling part 300 that may be utilized as first or second coupling part of a separable coupling in accordance with the present disclosure. The coupling part 300 is arranged at the end of a shaft 310 and comprises a base element 320 and three projections 321, 322, and 323 that are each realized as a pin extend radially outwards from the base element 320 with an angular offset of 180 degrees between each pair of neighboring projections 321 and 322, 322 and 323, and 323 and 321. The projections 321, 322, and 323 (i.e. their center lines) extend in a plane that is perpendicular to the longitudinal axis along which the shaft 310 extends. In contrast to the shown example, it is basically sufficient if one coupling part has one projection that is engaged with a receiving portion of the other coupling part of the separable coupling. Instead of one projection or three projections as shown, the respective coupling part may have two projections or four projections etc. The coupling element provided as a projection may take any form and is not limited to a pin. In case of two or more coupling elements realized as projections, each of the coupling elements may have its own shape and position.

Figure 3:
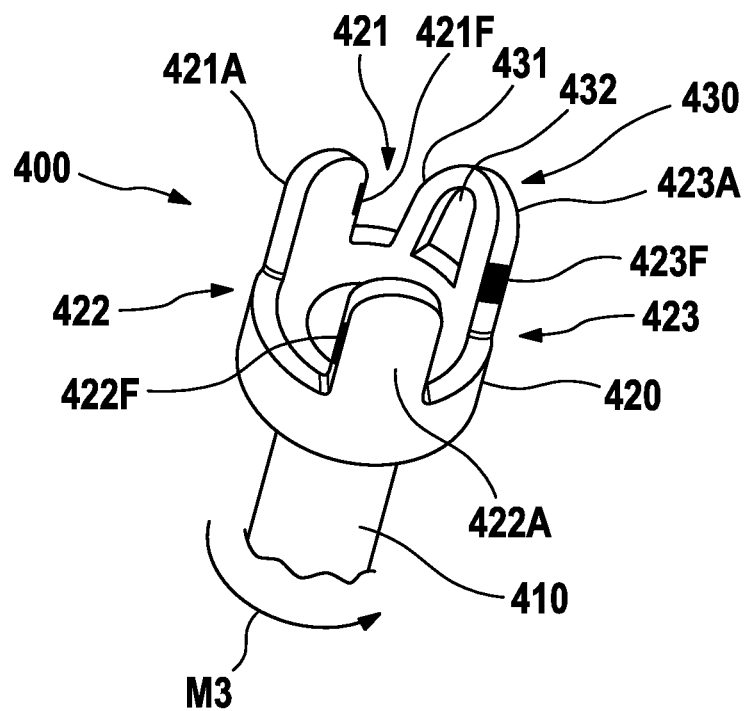
FIG. 3 is a schematic and isolated perspective view of another example coupling part of a separable coupling in accordance with the present disclosure.

FIG. 3 is a schematic and perspective depiction of an example coupling part 400 that may be utilized as first or second coupling part of a separable coupling in accordance with the present disclosure. In particular, the coupling part 400 may be engaged with the coupling part 300 shown in FIG. 2 to form a separable coupling. The coupling part 400 is arranged at the end of a shaft 410 and comprises a base element 420 and three receiving portions 421, 422, and 423 and also a resilient element 430. Each of the receiving portions 421, 422, and 423 is formed by the base element 420 and walls of neighboring wall elements 421A, 422A, 423A and in case of the receiving portion 421, one of the walls is defined by a wall of a spring arm 431 of the resilient element 430. The wall elements 421A, 422A and 423A each generally extend in a direction that is parallel to the longitudinal extension direction of the shaft element 410. Once the coupling element 400 has received respective projections from an engaging coupling part, the projections and the receiving portions 421, 422, and 423 are intended to interact along force transmission surfaces 421F, 422F, and 423F of the wall elements 421A, 422A, and 423A, respectively, so that a motion M3 in counterclockwise direction results. Further, it is intended that a projection engaging with receiving portion 421 has a size that is slightly larger in circumferential direction than the open width of the receiving portion 421 and that the projection bends the spring arm 431 of the resilient element 430 from its shown rest position into a deflected position in which the spring arm 431 is moved into the hollow 432 and biases the projection against the force transmission surface 421F. By this arrangement, the projection (e.g. projection 321 as shown in FIG. 2) and the receiving portion 421 are engaged in a gap-free manner in circumferential direction (i.e. in the direction of the motion M3) and any noise and wear due to repeated decoupling of projection and receiving portion during operation are effectively reduced.

Instead of two engaging coupling parts as shown in FIGS. 2 and 3 that each have only projections or receiving portions, the engaging coupling parts may each have a mix of projections and receiving portions, e.g. each coupling part may have one projection and one receiving portion.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A personal care device comprising:
    a head portion having a driven treatment head;
    a handle portion having a drive unit for providing a motion having a motion direction; and
    a drive train extending between the drive unit and the driven treatment head for transmitting the motion from the drive unit to the driven treatment head, the drive train comprising a separable coupling;
    the separable coupling comprising:
        a first coupling part having a first coupling element;
        a second coupling part having a second coupling element, the first and the second coupling elements being separably engaged with each other; and
        a resilient element biasing the first coupling element and the second coupling element against each other so that the first and second coupling elements are engaged in a gap-free manner along the motion direction, wherein the driven treatment head and the handle portion are arranged for being pivotable with respect to each other around at least a first pivot axis and the separable coupling is a separable universal joint.

2. The personal care device according to claim 1, wherein the resilient element is arranged for biasing a force transmission surface of the first coupling element and a force transmission surface of the second coupling element against each other.

3. The personal care device according to claim 1, wherein the motion is a rotary motion, wherein the drive train comprises a first shaft and a second shaft that are coupled by the separable coupling, the first shaft being coupled with the drive unit and the rotary motion is a motion around the longitudinal axis of the first shaft and the motion direction is circumferential with respect to the first shaft.

4. The personal care device according to claim 1, wherein the first and second coupling elements form a first pair of coupling elements and the separable coupling comprises at least three pairs of coupling elements.

5. The personal care device according to claim 1, wherein the separable coupling comprises a second pair of coupling elements and a second resilient element that is arranged to push the coupling elements of the second pair of coupling elements against each other so that force transmission surfaces of the second pair of coupling elements interact with each other when the motion direction is reversed.

6. The personal care device according to claim 1, wherein one of the first or second coupling elements is realized as a receptacle and the other one of the first and second coupling elements is realized as a pin, that is in separable engagement with the receptacle.

7. The personal care device according to claim 1, wherein the receptacle has an open end along a separation direction and wherein a chamfer is formed at the open end of the receptacle.

8. The personal care device according to claim 1, wherein the resilient element is integral with one of the first or second coupling parts.

9. The personal care device according to claim 1, wherein the resilient element and the coupling part at which the resilient element is integrally realized are made from a polyoxymethylene material.

10. The personal care device according to claim 1, wherein the resilient element comprises a spring arm arranged to be deflected when the coupling is in the coupled state.

11. The personal care device according to claim 1, wherein the resilient element is designed to provide a biasing force that is larger than the forces that are usually applied in a reverse motion direction during operation of the personal care device.

12. The personal care device according to claim 1, wherein the total pivot angle around the first pivot axis lies in a range of between 1 degree to 50 degrees.

13. The personal care device according to claim 1, further comprising at least one pair of separable mechanical connector elements for mechanically connecting the handle portion and the head portion.

14. The personal care device according to claim 1, wherein the resilient element is at least partly made from a spring metal.

* * * * *